Nov. 28, 1961    J. A. GORTON ET AL    3,010,784
PROCESS FOR MAKING URANIUM HEXAFLUORIDE
Filed Sept. 30, 1957    2 Sheets-Sheet 1

FIG. 1

NORMAN F. LE BLANC
JOHN A. GORTON
INVENTORS.

BY Ernest G. Peterson
AGENT

FIG. 2

NORMAN F. LE BLANC
JOHN A. GORTON
INVENTORS.

United States Patent Office 3,010,784
Patented Nov. 28, 1961

3,010,784
PROCESS FOR MAKING URANIUM HEXAFLUORIDE
John A. Gorton, Wilmington, Del., and Norman F. Le Blanc, Ellerslie, Md., assignors to Hercules Powder Company, Wilmington, Del., a corporation of Delaware
Filed Sept. 30, 1957, Ser. No. 687,852
12 Claims. (Cl. 23—14.5)

This invention relates to a process for preparing uranium hexafluoride ($UF_6$). Mor particularly, it relates to a process for preparing $UF_6$ from uranium ore concentrates which may be classified chemically as crude uranium oxides with the uranium usually in an apparent average valence state between four and six. It relates especially to a process for converting uranium tetrafluoride ($UF_4$) obtainable from such uranium ore concentrates to $UF_6$.

A conventional process for the preparation of pure $UF_6$ involves passing pure $UF_4$ concurrently with fluorine gas ($F_2$) downward in a tower under conditions such that a flame front is formed and the $UF_4$ can be said to burn in the fluorine gas. Wall temperatures in the tower are conventionally about 600° C. or higher, and the flame temperature is perhaps in the region of 900° C. Even with these high temperatures, the short contact time makes it difficult to get simultaneously complete conversion of uranium to $UF_6$ and efficient utillization of $F_2$. The usual operation is with an excess of $F_2$. As a result, elaborate and expensive condensing equipment is necessary to remove $UF_6$ completely from the relatively large amount of $F_2$.

The pure $UF_4$ fed to the towers is obtained, conventionally, from ore concentrates by a process involving dissolving the ore concentrate in nitric acid; extracting the uranyl nitrate into an organic solvent; separating and purifying the organic layer; extracting the purified uranyl nitrate back into an aqueous system; evaporating and calcining the aqueous layer to produce pure uranium trioxide ($UO_3$); reducing the $UO_3$ to uranium dioxide ($UO_2$) with hydrogen; and reacting the $UO_2$ with hydrogen fluoride in a screw conveyor, vibrating tray reactor or the like to produce $UF_4$. From this description it can be seen that this conventional ore concentrate treatment uses the expensive process of solvent extraction to produce $UF_4$ with only a few parts per million of impurities.

Even with $UF_4$ of such purity, difficulties are frequently encountered in fluorination tower operation because of buildup of slag on the cooler walls below the flame front. The usual explanation is that the nonvolatile impurities melt in the flame front and freeze upon striking the cooler walls of the tower. It can be understood that substitution of uranium salts with higher quantities of nonvolatile impurities in place of the "pure" $UF_4$ would magnify the difficulties with slagging and could in some cases render tower operation infeasible.

Such a situation would develop if an attempt were made to perform hydrogenation, hydrofluorination, and fluorination on ore concentrates directly and to depend on careful fractional distillation of $UF_6$ to produce the purity needed for atomic energy uses and conventionally obtained by the aforementioned expensive process of solvent extraction. Nowhere in the literature is there a full appreciation of the problems encountered in substituting ore concentrates and impure uranium compounds for "pure" $UF_4$. Moreover, a successful process has never been described.

Published attempts at the fluorination of $UF_4$ to $UF_6$ have involved the use of stationary tray reactors, vibrating tray reactors, screw feeders, and the like. These reactors have not been successful on a commercial scale because of limitations on heat transfer which prevent satisfactory removal of the large amounts of heat generated in the exothermic reaction of $UF_4+F_2\rightarrow UF_6$. Localized melting and sintering have frequently occurred to disturb reactor operation.

One experimenter has used liquid phase operation with bromine trifluoride as a means of overcoming heat transfer difficulties. Heat removal can be accomplished by refluxing the liquid reagent. On a laboratory scale, operation was smooth with good conversion to $UF_6$ and apparent high utilization of fluorine. (See I. Sheft et al., U.S. Atomic Energy Commission Report ANL-5007, 1953). Commercial interest in this process has not developed, primarily because of difficulties in recovering by-product bromine and in removing bromine from the $UF_6$ to the extent necessary for atomic energy uses.

We have now discovered a novel process for producing $UF_6$ from uranium compounds wherein slagging and sintering difficulties are completely overcome, wherein heat evolution is controlled, wherein no additional contaminants are introduced, and particularly wherein purity restrictions on the feed are removed and direct operation on ore concentrates is possible. This process involves a combination of a number of steps or reactions as follows:

(A) *Comminution and classification.*—A suitable uranium ore concentrate, containing one or more uranium oxides or sodium diuranate ($Na_2U_2O_7$), etc., is first comminuted and classified to a particle size satisfactory for fluidizing in accordance with methods known in this art.

(B) *Reduction.*—The higher valent uranium oxides in the ore concentrate are then reduced to $UO_2$ by contacting the ore concentrate in the form of a fluidized bed with a hydrogen-containing gas in at least two different stages. The contact temperature-time conditions in the first stage are such as are effective to reduce most reducible impurities and part of the higher-valent uranium oxides to $UO_2$ but not such as to reduce all of said higher-valent uranium oxides in the ore concentrate to $UO_2$. The contact temperature-time conditions in the last stage are such as are effective to substantially complete the reduction of the higher-valent uranium oxides to $UO_2$. The contacting in each stage is carried out by passing the hydrogen-containing gas upwardly through a body of the ore concentrate with a gas velocity sufficient to fluidize the body.

(C) *Hydrofluorination.*—After the reduction of the uranium ore concentrate has been effected, the reduced ore concentrate is then treated to convert the $UO_2$ to $UF_4$ by contacting the reduced ore concentrate in the form of a fluidized bed with an HF-containing gas in at least two different stages. The contact temperature in the first stage is one which is effective to hydrofluorinate most hydrofluorinatable impurities and some of the $UO_2$ but which is not so high as to generate sufficient heat to raise the temperature of the bed to the sintering point. The contact temperature-time conditions in the last stage are such as are effective to substantially complete the hydrofluorination of $UO_2$ to $UF_4$. The contacting in each stage is carried out by passing the HF-containing gas upwardly through the reduced ore concentrate with a gas velocity sufficient to fluidize the body.

(D) *Fluorination.*—Following the hydrofluorination, any uranium compounds in the resulting $UF_4$-containing ore concentrate are converted to $UF_6$ by contacting said $UF_4$-containing ore concentrate in the form of a fluidized bed with an $F_2$-containing gas in at least two different stages. The fluorination in the first stage is controlled so that a nonvolatile uranium composition is produced to the substantial exclusion of $UF_6$. The contact temperature employed in the first stage is one which is effective to initiate the reaction $2UF_4+F_2=2UF_5$ but below about 300° C. whereas the contact temperature-time conditions in the last stage must be such as are effective to substantially complete the conversion of the uranium compounds to $UF_6$. The contacting in each stage is carried out by passing the $F_2$-containing gas upwardly through a body of the uranium fluoride-containing concentrate with a gas velocity sufficient to fluidize the body.

(E) *Distillation.*—Finally, the off-gas streams from the fluorination stages containing any $UF_6$ are treated to condense the $UF_6$ therefrom and the condensate is then purified, as, for example, by fractional distillation.

While the series of staged reactions as outlined above is the most advantageous and economical way of making $UF_6$ from uranium ore concentrates, it is emphasized that the fluidized bed stage-wise operation of the fluorination step is a very important feature of this invention. In fact, it is possible to go directly from the uranium ore concentrate to $UF_6$ using this step. Thus, fluorination of a uranium ore concentrate directly without preliminary hydrogenation or hydrofluorination is within the scope of this invention. Moreover, hydrogenation or hydrofluorination by mechanical gas-solids contacting devices other than fluidized bed reactors such as, for example, tray, moving bed or other conveying-contacting systems may be used to provide the feed material for the fluorination step. The hydrogenation or hydrofluorination reactions may be conducted on lumps or pelletized intermediates with grinding to a proper size for fluidization just prior to the fluidized fluorination reaction.

In accordance with this particular feature of the invention the starting material may be any uranium concentrate wherein the uranium is in the form of a uranium compound in which the average valence state of the uranium is from +4 to +6. Thus the starting material may be a uranium concentrate wherein the uranium is in the form of a uranium oxide in which the average valence state of the uranium is from +4 to +6, a uranium concentrate wherein the uranium is in the form of a uranium fluoride in which the average valence state of the uranium is from +4 to +5, a uranium concentrate wherein the uranium is in the form of one of the aforementioned oxides chemically combined with an acidic oxide or a basic oxide, a uranium concentrate in which the uranium is in the form of $UO_2F_2$, and so forth. As examples of the aforementioned combinations of uranium oxides with acidic or basic oxides there may be mentioned the combinations of uranium oxides with $Na_2O$, $P_2O_5$, and the like. Included in the materials which may be used as suitable starting materials are any crude uranium ore concentrate, i.e. any uranium ore concentrate as such, or any uranium ore concentrate treated to reduce the higher valent uranium oxides to $UO_2$. Additionally, the starting material may be relatively pure uranium compounds such as $UO_3$, $U_3O_8$, $UF_4$, $UF_5$, etc. When pure $UF_4$ is subjected to fluorination in accordance with the invention, it may, of course, be obtained by the conventional process for making $UF_4$ described previously, but the economic advantage of substituting distillation for expensive solvent extraction as a means of purifying the $UF_6$ would not be obtained.

According to this particular feature of the invention the uranium concentrate is comminuted and classified to a particle size satisfactory for fluidizing. Then the uranium concentrate is converted to $UF_6$ by contacting the concentrate in the form of a fluidized bed with an $F_2$-containing gas in at least two different stages. The fluorination in the first stage is controlled so that a nonvolatile uranium composition is produced to the substantial exclusion of $UF_6$. The contact temperature in the first stage is one which is effective to initiate the reaction of the uranium concentrate with fluorine but below about 300° C., whereas the contact temperature-time conditions employed in the last stage are such as are effective to substantially complete the conversion of the uranium compounds contained in said uranium concentrate to $UF_6$. The contacting in each stage is carried out by passing the $F_2$-containing gas upwardly through a body of uranium concentrate with a gas velocity sufficient to fluidize the body. Finally, $UF_6$ is condensed from the off-gas streams of the fluorination stages.

Referring again to the preferred process of this invention wherein a uranium ore concentrate is subjected to a series of reactions including reduction, hydrofluorination and fluorination under fluidizing conditions, it is essential that the ore concentrate be ground and classified to a particular particle size suitable for fluidizing.

Wherever in connection with any stage or step of this process, the terms "fluidization," "fluidizing conditions," etc., are employed, reference is made to an engineering unit operation for gas-solid contacting wherein the solid is particulate and free-flowing and wherein contact with the reagent-containing gas is effected by passing the gas upwardly through a body of the particulate solid with a gas velocity sufficient to levitate and to mix thoroughly the solid particles but insufficient to carry an appreciable portion of said solids out of the levitated body of particulate solid or out of the reactor. Optimum conditions for creating fluidizing conditions for any stage or step of this invention will be determined by conventional engineering techniques, in which the following factors, among others, will be considered: solid density, particle shape, particle volume, range of particle sizes, electrostatic effects, gas density, gas velocity, gas viscosity, geometry of the particulate solid body, etc. Said optimum conditions are usually best determined by experiment but are generally not critical enough to require excessive control.

For the solids and gases contemplated in this invention, the following conditions constitute a good starting point for experimentation:

Uranium-containing solid—through 40 on 200 mesh standard sieves
Effective gas velocity—0.5 feet per second
Quiescent bed depth-to-diameter ratio—2:1

Normally, gas velocities will be decreased when smaller solid particles are used. The limit on decreasing particle size is frequently set by electrostatic and other effects which become active to cause very fine particles to aggregate and to cause channels to form through which the gas can by-pass the majority of the solid bed. Bed depth-to-diameter ratios will normally be over 1:1 and may be as high as 6:1, although operation outside these ranges may be possible in certain cases.

The fluidization stages or steps of this invention may be carried out in conventional batch or continuous equipment. In continuous operation, staging may be accomplished in a tower wherein the particulate solid is fed to the top gas-distributor plate and said solid overflows continuously to lower gas-distributor plates mounted in the tower and wherein the gas flows countercurrently upward through successively higher distributor plates, provided that means are provided to cool the higher sections of the tower so as to maintain the temperature staging required by this invention. Preferably, however, continuous operation will involve a multiplicity of fluidized bed reactors in series so that temperature control is facilitated by the ability to adjust each reactor separately. In continuous operation, the reactor or portion of reactor devoted to each stage will operate at an equilibrium in which the solids removed will normally be representative of the composition of the fluidized bed. Temperature, entering and exit gas compositions, and gas flow rate will be held constant.

In batch operation, all of these factors may be changed as the reaction proceeds, and more than one stage or step may be carried out without removing the solids from the reactor. In batch operation the recycle of exit gases from one stage to a preceding stage will normally require gas storage and/or operation with a series of equivalent reactors with the exit gas from a reactor being used as part or all of the feed gas to another reactor which is at that time being operated at the preceding stage in the process step.

The fluidization reactors will, of course, be constructed of suitably corrosion-resistant materials. Since these reactors will normally be operated above the condensation temperature of any reactants or products, only gas corrosion and solid erosion will be encountered and these can be minimized by using, for example, steel or stainless steel for the hydrogenation step and Monel or nickel for the hydrofluorination and flourination steps. The off-gases from many of the fluidized reaction stages will contain substances corrosive in the liquid state, so that more severe corrosion problems may be encountered in the off-gas lines. These problems can be handled readily by conventional means.

In this specification, nitrogen is used as an example of an inert gas with which reactant gases for the various steps may be diluted. This gas is particularly convenient in the hydrogenation step, where cracking of ammonia can be used to produce a suitable mixture of 3 parts of hydrogen and 1 part of nitrogen. Nevertheless, it is still within the scope of this invention to use other inert gases such as helium, argon, and the like in any step requiring diluent. In addition, special combinations may be employed, such as the use of hydrogen as a diluent for HF in the hydrofluorination step. Other combinations will suggest themselves to one skilled in the art.

In the aforementioned step B—reduction, the higher valent uranium oxides are reduced to $UO_2$ with a hydrogen-containing gas in at least two different stages. The contact temperature-time conditions in the first stage are such as are effective to reduce substantially all of the reducible impurities and part of the higher-valent uranium oxides to $UO_2$ but not such as to reduce all of said higher-valent uranium oxides in the ore concentrate to $UO_2$. In other words, two separate stages for the reduction are essential. If only one is used, the reactivity of the resulting product toward HF in the subsequent hydrofluorination step will be considerably impaired. Relatively large amounts of inert diluent in the hydrogen-containing gas in the first stage of the reduction will advantageously increase the heat-carrying capacity of the gas per unit of reducing power. In succeeding stages, the contact temperature is raised and/or the hydrogen concentration of the gas is increased to obtain reduction but still within the heat removal capacity of the system. The final reduction stage involves temperature-time conditions high enough to substantially complete the reduction of higher-valent uranium oxides to $UO_2$. In the initial stage of the reduction hydrogen is rapidly and often completely adsorbed, while in the final stage hydrogen adsorption is slow and hydrogen consumption is usually incomplete. In order to utilize as much as possible of the hydrogen, the off-gases from the final stage or stages may sometimes advantageously be used as part or all of the gas feed to the preceding stages.

The particular operating conditions employed in this step B—reduction will depend on such factors as the reactivity of the ore concentrate feed, the amount and kind of impurity present in the feed, and the valence state of the uranium in the feed. Since various feed materials will normally be utilized, the equipment must be versatile enough to allow for the necessary process condition adjustments. The temperature-staged fluidized bed reactors of this invention provide exceptional versatility. With an ore concentrate of average reactivity analyzing about 75% $U_3O_8$ and containnig about 1% each of vanadium, phosphorus, sulfur and arsenic; about 2% each of copper and iron; and varying amounts of silicon, sodium, calcium, etc., two stages of hydrogenation give satisfactory reaction control with a product of good reactivity in the succeeding hydrofluorination step. The first stage may advantageously be carried out at about 400° C. for 15–30 minutes, using as a gas feed a 3:1 by volume mixture of hydrogen and nitrogen. The second step, at 575–600° C. for 15–30 minutes with the same gas feed, will produce crude uranium oxide in which essentially all of the uranium has a valence of plus four. The majority of the arsenic and sulfur and smaller amounts of some other impurities will be found as arsine, hydrogen sulfide, and other hydrides in the off-gas from the first stage. Temperatures much higher than 600° C. in hydrogenation can deactivate the product in regard to subsequent hydrofluorination.

In the aforementioned step C—Hydrofluorination, the ore concentrate is treated to convert the $UO_2$ to $UF_4$ by contacting it in the form of a fluidized bed with an HF-containing gas in at least two different stages. The contact temperature in the first stage is one which is effective to hydrofluorinate most of the hydrofluorinatable impurities and some of the $UO_2$, but at the same time it must not be so high as to generate sufficient heat to raise the temperature of the bed to the sintering point. Here, of course, the heat removal capacity of the system must be taken into consideration. Since the mixture of $UO_2$, $UF_4$ and impurities frequently has a sintering point lower than that of pure $UO_2$ or pure $UF_4$, the temperature in the first stage (or stages) of hydrofluorination must be chosen carefully and controlled as herein described. Preferably, the temperature in each succeeding hydrofluorination stage is higher than that in the next preceding stage, and the final hydrofluorination stage is carried out at a temperature high enough to drive the reaction essentially to completion. This final stage temperature is often above the temperature which will cause sintering in an early hydrofluorination stage. Just as in the hydrogenation step inert gas diluents are desirable in the initial stages to remove heat. These diluents are less desirable in the later stages where reaction rate depends on HF-concentration, where rates are slow as conversion to $UF_4$ approaches 100%, and where HF consumption may be incomplete. Recycle of exist gases from the later stages to serve as part of the feed to the initial stages can advantageously serve to increase HF utilization.

In this step C—Hydrofluorination, the temperature in the first stage where sintering of the bed can occur is critical. However, the particular temperature at which sintering occurs varies with the feed material employed. In the first stage, the average feed material can be safely treated for approximately 2 hours at 250° C. with a 1:2 by volume mixture of HF and nitrogen. A second stage at 500° C. for 2 hours with 100% HF gas will normally essentially complete the hydrofluorination to $UF_4$. With feeds of unusually poor reactivity, a third stage at a temperature as high as 600° C. may be necessary to get optimum conversion. The majority of such impurities as phosphorus, molybdenum, and sometimes silicon will appear as fluorides in the off-gases from the hydrofluorination steps.

In the aforementioned step D—Fluorination, the fluorination feed is contacted in the form of a fluidized bed with an $F_2$-containing gas in at least two different stages. In the first stage, the contact temperature is maintained so low (under about 300° C.) that the uranium is not fluorinated to the volatile $UF_6$ but only to an essentially nonvolatile form. Several stages at temperatures under about 300° C. may be required, and the number of such stages is determined by the heat removal capacity of the apparatus and of the $F_2$-containing gas. The presence of inert gas diluent in the $F_2$ will improve heat removal in these stages at below 300° C. Preferably, the fluorination in the stage or stages at below 300° C. will be such as to provide a nonvolatile uranium composition wherein the average valence of the uranium is about plus five. Fluorine consumption is generally rapid and complete. Molybdenum, vanadium, and some other elements are at least partially volatilized as fluorides and are thus separated from the uranium in the low temperature stage or stages.

In the final stage the contact temperature is maintained high enough to secure essentially complete conversion of the nonvolatile uranium composition to the volatile $UF_6$ which is removed from the bed as gas, leaving nonvolatile salts such as sodium and calcium fluorides in the reactor. If the reaction is run in batch equipment, this stage is thus characterized by a disappearing bed; if the reaction is run continuously, it is characterized by a large solids feed to and a small solids takeoff from the reactor. In this final stage, no difficulties have been encountered with sintering, so that only one stage at high temperature is normally required. However, in some cases, the desire for quantitative recovery of the uranium may require a subsequent smaller fluidized bed reactor to refluorinate the nonvolatile ash from the final stage main reactor.

In the final stage main reactor the fluidizing gas should be $F_2$ with as few contaminants as possible in order to reduce the amount of noncondensables in the off-gas and thus simplify the problems of condensing $UF_6$ from this stream. The $UF_6$ may be removed as a solid in a suitable condenser, or the gas may be compressed enough to allow condensation of a major part of the $UF_6$ as a liquid. In the latter case, a small subsequent solids condenser will usually be found desirable. The off-gas from the condensers will consist primarily of $F_2$ with a small amount of $UF_6$ which has not been condensed, together with the noncondensable gases which were present as impurities in the "pure" $F_2$ feed to the final stage. Economy will generally dictate that this $F_2$-containing off-gas from the condensers be recycled and used as part of the feed to the initial fluorination stage or stages. This recycle will make use of the $F_2$ and additionally will recover uranium from the gas because the $UF_6$ therein has been found to react readily with $UF_4$ at temperatures under about 300° C., approximately according to the following reaction:

$$UF_6(g) + UF_4(s) \rightarrow 2UF_5(s)$$

In this step D—Fluorination, temperature is an important factor in causing the first stage (or stages) of reaction to proceed only to the formation of a nonvolatile uranium composition and to the substantial exclusion of $UF_6$.

For reaction times up to several hours and $F_2/N_2$ ratios of 1:2–1:50 by volume, no significant amount of uranium will be volatilized from the average feed when the temperature is maintained below 300° C. and preferably at about 200° C. Fluorine utilization is essentially quantitative until enough fluorine is absorbed to convert the contained uranium approximately to $UF_5$. In the high temperature stage in which $UF_6$ is formed, temperatures of preferably 450–500° C. will normally volatize essentially all of the uranium in less than about one hour with a gas feed of 100% $F_2$. The high limit on temperature is the sintering point of the sodium, calcium, and similar fluorides, fluosilicates, etc., remaining after uranium removal; temperatures as high as 600° C. may be employed in most cases.

When the feed to the fluorination step of this invention is carried out on a product consisting of $UF_4$, as in the preferred embodiment of this invention, the low temperature (below 300° C.) stage or stages produce a nonvolatile composition in which the uranium is in the form of uranium fluorides having an empirical formula of approximately $UF_5$. When the feed to the fluorination step contains uranium oxides, and particularly when the uranium is in an average valence state above +4, $UO_2F_2$ will be a product of the low temperature stage or stages. Uranium fluoride having an empirical formula of about $UF_5$ will also be present if the original uranium average valence state is less than +6. Regardless of whether said $UF_5$ or $UO_2F_2$ or a mixture of the two is formed, the low temperature stages result in a nonvolatile uranium composition which is partially fluorinated. In addition, most impurities will be fluorinated to the highest possible fluorides under these conditions. This nonvolatile uranium composition is a satisfactory feed for the high-temperature fluorination stage or stages.

With reference to the aforementioned step E—Distillation, the major remaining impurities in the $UF_6$ product from step D are fluorides such as $MoF_6$ and $VF_5$ which boil about 30° C. below $UF_6$, and vanadium oxyfluorides which boil about 50° C. above $UF_6$. The $UF_6$ product will usually by 99+ percent pure, but further purification is necessary for atomic energy uses. When continuous distillation is used for purification, a two-column setup is necessary, one column to remove low-boilers and one column to remove high-boilers. In batch distillation, the desired product will be a heart cut, with low-boilers and high-boilers being removed. Although the temperature differentials quoted in this paragraph are sufficiently large that the impurities can be lowered to a part-per-million level by careful distillation, this invention also encompasses the addition to the still feed of compounds such as KF which can form complexes with some volatile fluorides and change their vapor pressure relative to $UF_6$.

Referring to the preferred process of this invention wherein the uranium ore concentrate is subjected to a series of reactions under fluidizing conditions, it possesses the important advantage over prior art processes that it avoids expensive solvent extraction steps and is overall much more economic to carry out. Also, in all of the steps where chemical reactions are effected it is possible to control the temperature of the reactions very closely. Sintering is virtually eliminated in all of these steps. Hence, the particle size and form of the solid reactants remain essentially the same throughout the process. The capacity per reactor volume is high due to the good heat transfer which is obtained under the conditions of operation. The process also makes it possible to recover substantially all of the uranium values in the ore as $UF_6$. The crude $UF_6$ product initially obtained is easily purified by distillation due to the segregation of by-product impurities during the earlier steps of the process and during the first stage of the fluorination step.

With respect to the fluorination reaction per se, the present invention has advantages over the conventional processes in regard to ease of control, freedom from high temperature corrosion, and ability to operate under pressure so that $UF_6$ may be condensed as a liquid. The present invention permits gas recycle of off-gas from any fluorination stage to an earlier stage so that fluorine is used efficiently and $UF_6$ vapor from the condensers is scrubbed and removed essentially completely without the necessity of elaborate low temperature condensation equipment. When impure feeds are used, this invention permits partial separation of impurities from the uranium in the early stages of the fluorination step, so that the $UF_6$ product from the last stage may be more easily purified by distillation.

Figure 1:
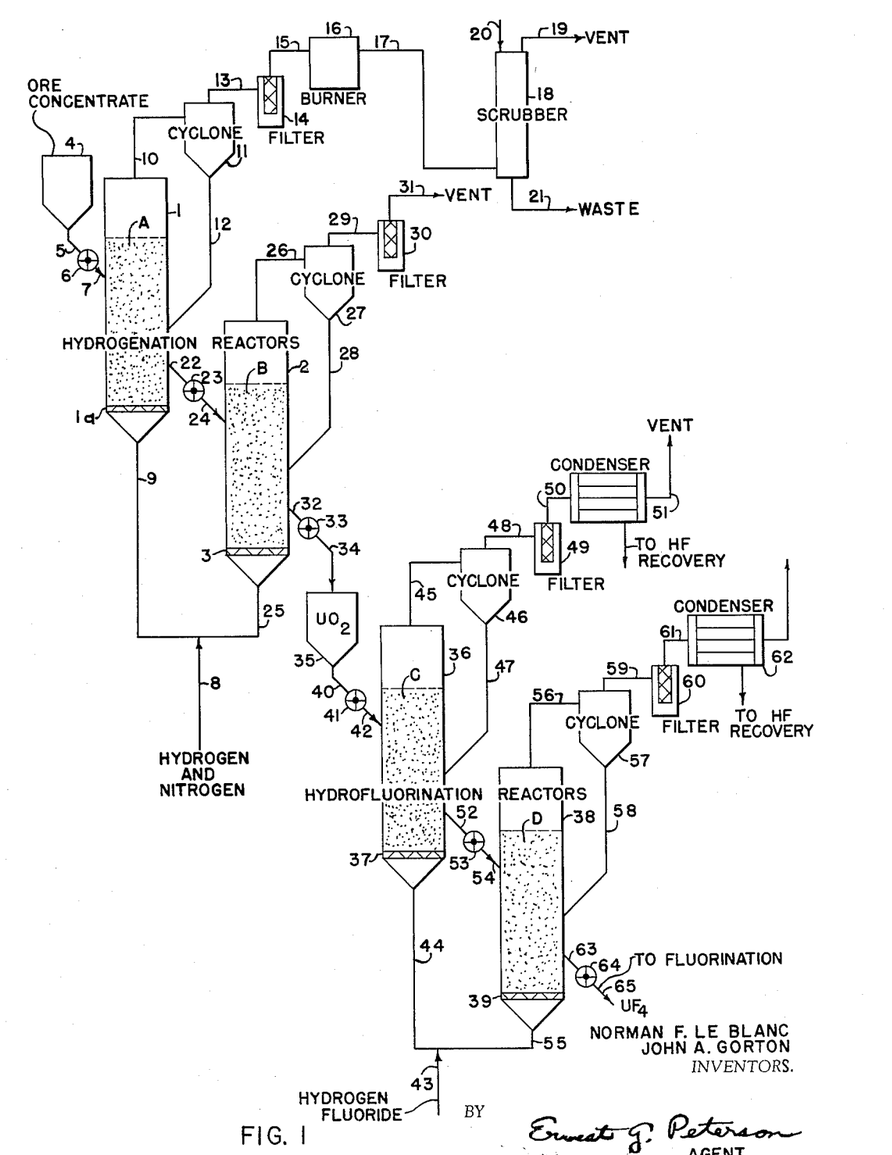
FIGURE 1 illustrates a flow diagram in elevation showing an apparatus and the arrangement thereof suitable for performing the hydrogenation and hydrofluorination steps of the preferred process in accordance with the invention.

In FIGURE 1, the hydrogenation step is shown as being carried out in two stages. The reactor 1 used in the first stage is a fluid bed reactor. It contains finely divided uranium ore concentrate A which is being hydrogenated in the form of a fluidized bed. The reactor contains a perforated plate 1a which acts to disperse the incoming $H_2$-containing gas and to confine the fluidized bed of ore thereabove. The reactor 1 is surrounded by an electric heating jacket not shown in the drawing. The second stage hydrogenation reactor shown as 2 is identical with the first stage reactor. The ore concentrate and the perforated plate therein are shown as B and 3, respectively.

In operation, the uranium ore concentrate of a suitable particle size passes from storage tank 4 into line 5, thence through a metering device such as a star valve 6 into line 7 and from there into reactor 1. Gas consisting of a mixture of hydrogen and nitrogen supplied from a source not shown passes through lines 8 and 9 into the bottom of the reactor at a point below the plate 1a and upwardly through the openings in the plate. The gas is supplied to the reactor under suitable conditions as respects velocity, temperature and pressure to effect the fluidization of the solids therein. The major portion of the nitrogen, any water formed, and a small part of the hydrogen in the gas admitted into the reactor passes out of the top thereof through line 10 with possibly a small amount of solids entrained therewith. From line 10 the gas passes through a cyclone separator 11 where the entrained solids are removed if present. The solids settle to the bottom of the separator and may be recycled through line 12 back to the first stage hydrogenation reactor. The gas from which the solids have been separated passes from the cyclone separator through line 13 into filter 14 which acts as a safety device to prevent any uranium values from being lost. From the filter the gas is passed through line 15 to burner 16 where any $H_2$, hydrides, and other combustibles in the gas are burned. The combustion products pass from the burner through line 17 into a scrubber 18 wherein arsenic, sulfur and similar oxides are removed by contact with an aqueous stream passed countercurrently thereto and the scrubbed gases are finally vented to the atmosphere through line 19. The aqueous stream is shown as passing through line 20 into the scrubber 19 and thence to waste through line 21.

Ore concentrate is continuously removed from reactor 1 and introduced into reactor 2 through line 22, a metering device such as a star valve 23, and line 24. An alternative procedure is to continuously withdraw the ore concentrate from reactor 1 and pass it to a storage hopper from which it is metered into the reactor 2.

The operation of the second stage hydrogenation is essentially the same as the first with the exception that the temperature employed in the second stage is higher. Hydrogen-containing gas is passed through lines 8 and 25 into the bottom of the reactor. The diluent in the gas, the water formed, and some of the hydrogen admitted into the reactor passes out of the top thereof through line 26 into cyclone separator 27 where the entrained solids are removed and recycled back to the reactor through line 28. The gas from which the solids have been separated passes from the cyclone separator through line 29 into the polishing filter 30 and is then vented to the atmosphere. If the gas in line 31 contains undesirably large quantities of toxic substances, the gaseous effluent from the filter may be burnt and the combustion gases scrubbed prior to venting as in the case of the effluent gases from the first stage hydrogenation.

Hydrogenated ore concentrate is continuously withdrawn from reactor 2 through line 32 and a metering device such as star valve 33. The withdrawn material is passed through line 34 into storage tank 35. In FIGURE 1, this storage tank is labeled $UO_2$ since substantially all of the uranium values in the ore concentrate are at this point in the form of $UO_2$.

The hydrofluorination step in FIGURE 1 is shown as being carried out in two stages. The reactor 36 used in the first stage is a fluid bed reactor. It contains finely divided hydrogenated ore concentrate C which is being hydrofluorinated in the form of a fluidized bed. The reactor contains a perforated plate 37 which acts to disperse the incoming HF-containing gas and to confine the fluidized bed of ore thereabove. The reactor 36 is surrounded by an electric heating jacket not shown in the drawing. The second stage hydrofluorination reactor shown as 38 is identical with the first stage reactor. The ore concentrate and the perforated plate therein are shown as D and 39 respectively.

In operation the hydrogenated ore concentrate of suitable particle size passes from storage tank 35 into line 40, thence through a metering device such as star valve 41 to line 42 and from there into reactor 36. HF-containing gas supplied from a source not shown passes through lines 43 and 44 into the bottom of the reactor at a point below the plate 37 and upwardly through the openings in the plate. The gas is supplied to the reactor under suitable conditions as respects velocity, temperature and pressure to effect the fluidization of the solids therein. The diluent in the gas, the water formed, and some of the HF admitted into the reactor passes out of the top thereof through line 45 with a small amount of solids entrained therein. From line 45 the gas passes through a cyclone separator 46 where the entrained solids are removed and recycled back to the reactor through line 47. The gas from which the solids have been separated passes from the cyclone separator through line 48 into the polishing filter 49. From the filter the gas is passed through line 50 to condenser 51 where the aqueous HF therein is condensed. The liquid condensate from the condenser is passed to HF recovery whereas the noncondensables are vented to the atmosphere.

Ore concentrate is continuously removed from reactor 36 and introduced into reactor 38 through line 52, a metering device such as star valve 53 and line 54. Alternatively, ore concentrate may be drawn from reactor 36 and passed to a storage hopper from which it is metered into reactor 38. The operation of the second stage hydrofluorination is essentially the same as the first with the exception that the temperature employed in the second stage is higher. HF-containing gas is passed through lines 43 and 55 into the bottom of the reactor. The diluent gas plus some of the HF, and water formed in the reaction, passes out of the top of the reactor through line 56 into cyclone separator 57 where the entrained solids are removed and recycled back to the reactor through line 58. The gas from which the solids have been separated passes from the cyclone separator through line 59 into the polishing filter 60. From the filter the gases pass through line 61 into the condenser where the HF content thereof is removed by condensation and passed to HF recovery. The noncondensables are vented to the atmosphere.

Figure 2:
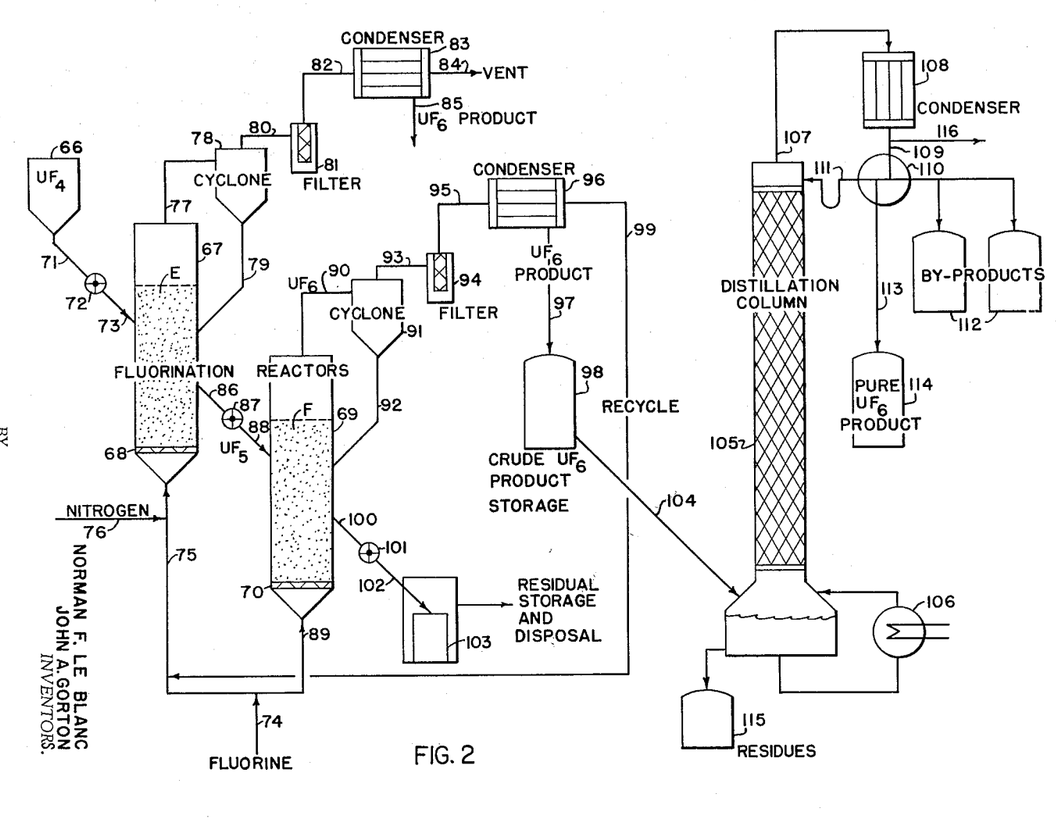
FIGURE 2 is a continuation of this flow diagram and shows an apparatus and arrangement thereof suitable for performing the fluorination, condensation and distillation steps of the preferred process.

Hydrofluorinated ore concentrate is continuously withdrawn from reactor 38 through line 63 and a metering device such as star valve 64. The withdrawn material is passed through line 65 into storage tank 66 (FIG. 2). This storage tank is labeled $UF_4$, since substantially all of the uranium values are at this point in the form of $UF_4$.

The fluorination step illustrated in FIGURE 2 is shown as being carried out in two stages. The reactor 67 used in the first stage is a fluid bed reactor. It contains finely divided $UF_4$-containing ore concentrate E which is being fluorinated in the form of a fluidized bed. The reactor contains a perforated plate 68 which acts to disperse the incoming $F_2$-containing gas and to confine the fluidized bed of ore thereabove. This reactor is surrounded by an electric heating jacket not shown. The second stage fluorination reactor shown as 69 is identical in design with the first stage reactor but may be smaller. The ore concentrate and the perforated plate are shown as F and 70, respectively.

In carrying out this fluorination operation the $UF_4$-containing ore concentrate of suitable particle size passes from storage tank 66 into line 71, thence through star valve 72 into line 73 and from there into reactor 67. $F_2$-containing gas supplied from the source not shown passes through lines 74 and 75, is diluted with $N_2$ through line 76, and passes into the bottom of the reactor at a point below plate 68 and upwardly through the openings in the plate. The gases are supplied to the reactor under suitable conditions as respects velocity, temperature and pressure to effect the fluidization of the solids therein. The diluent nitrogen plus very small amounts of $F_2$, $UF_6$, and volatile fluorides passes out of the top thereof through line 77 with a small amount of solids entrained therein. From line 77 the gas passes through a cyclone separator 78 where the entrained solids are removed and recycled back to the reactor 67. The gas from which the solids have been separated passes from the cyclone separator through line 80 into polishing filter 81. From the filter the gas is passed through line 82 into condenser 83 where any $UF_6$ present in the gas stream is condensed as a solid and is withdrawn at intervals through line 85 as a liquid under pressure to crude $UF_6$ product storage 98. In the operation of the process in accordance with this invention the amount of $UF_6$ contained in the gaseous effluent from reactor 67 will be very small, if any. Hence, the amount of $UF_6$ product condensed in condenser 83 is correspondingly small. The noncondensables in the gas stream are vented to the atmosphere through line 84. Alternatively, the small amounts of uranium in the gas stream may be recovered in a scrubber and recycled to the system.

Fluorinated ore concentrate is continuously removed from reactor 67 and introduced into reactor 69 through line 86, star valve 87 and line 88. An alternative procedure is to continuously withdraw the ore concentrate from reactor 67 and pass it to a storage hopper whence it is metered into reactor 69. The operation of the second stage fluorination is significantly different from the first stage in that in the second stage the uranium values in the ore are substantially entirely converted to $UF_6$ which is gaseous under the conditions of operation, and the uranium values are removed from the reactor in that form. Also, the temperature employed in the second stage is higher. Florine gas, preferably without diluent, is passed through lines 74 and 89 into the bottom of the reactor under such conditions as respects velocity, temperature and pressure as to effect the fluidization of the solids therein. The gaseous effluent from this reactor consists substantially entirely of $UF_6$ and unreacted fluorine along with minor amounts of volatile fluoride impurities. This gaseous effluent from the reactor passes through line 90 into cyclone separator 91 where entrained solids are removed and recycled back to the reactor through line 92. The gas from which the solids have been separated passes from the cyclone through line 93 into polishing filter 94. From the filter the gases pass through line 95 to condenser 96 where the $UF_6$ content of the gas is condensed out as liquid or, alternatively, solid $UF_6$ which is passed through line 97 into crude $UF_6$ storage tank 98. The noncondensable gas is substantially entirely fluorine and it is recycled through line 99 to line 75 as make-up gas for the first stage fluorination.

As stated above, the uranium values in the ore concentrate introduced into reactor 69 are converted therein to $UF_6$ which is gaseous under the conditions of the reaction and is removed as such from the reaction zone. There are, however, solid components which remain in the reaction zone as residue. In the continuous operation of the process this residue is removed from the reactor either continuously or intermittently through line 100, star valve 101 and line 102 and run into container 103 for disposal. This residue will normally contain radioactive components and the necessary precautions must be observed in the handling thereof.

In the crude $UF_6$ distillation step, a batch of crude $UF_6$ from storage tank 98 is transferred to the still pot of column 105 having about 20 theoretical plates which is heated by heater unit 106. The vapors from the top of the column pass out through line 107 into condenser 108. Several cuts are taken including a first cut containing any low boilers such as $MoF_6$, compounds of vanadium, phosphorus, sulfur, silicon, etc., a first break cut, a heart cut, a heart cut consisting of $UF_6$ and a second break cut.

From the condenser the distillate is passed through line 109 either to by-product storage 112 or to $UF_6$ storage 114. The desired reflux ratio (usually about 10:1) is maintained by recycling distillate to the column through line 111. 110 is a reflux splitter for effecting the desired reflux ratio.

The heavy ends from the still pot are removed periodically and accumulated in residue storage receptacle 115. As in the case of the residue from the fluorination reactors, this residue from the still will normally contain radioactive components and the necessary precautions must be observed in the handling thereof. The residue from either source may be treated to remove the uranium content by hydrolysis and conversion to $UO_3$ which can then be recycled.

It is understood that the process detailed above is descriptive of only one embodiment of our invention and equipment modifications such as the substitution of batch for continuous fluidized bed reactors in any of the above-described reaction steps, the substitution of continuous for batch distillation, and the substitution of screw feeders, tray reactors or the like for the fluidized bed reactors in any or all of the stages in the hydrogenation or hydrofluorination steps would still be within the scope of the invention.

The following examples illustrate the operation of our improved process, without thereby implying any limitation other than is contained in the foregoing general description and in the appended claims. All parts and percentages are by weight unless otherwise indicated. All gas proportions referred to are by volume.

*Example 1*

Seven hundred grams of uranium ore concentrate (analyzing 89% $U_3O_8$) having a particle size of 40–200 mesh was introduced into a stainless steel fluidized bed reactor two inches in diameter and two feet high, said reactor having a micrometallic filter disk sealing the bottom of the two-inch tube, and said micrometallic disk being used to disperse the gas used for fluidization and reaction. A gas mixture consisting of three moles of hydrogen and one mole of nitrogen was passed through the bed with a linear velocity of approximately 0.4 feet per second. The reactor walls and the incoming gases were heated to 350° C. and the bed temperature was accordingly 350° C. Gas metering equipment and conductivity measurements on the gas inlet to and outlet from the reactor both indicated smooth consumption of the major part of the hydrogen from the fluidizing gas. Heating of the reactor walls and incoming gas was decreased to maintain a bed temperature of 350° C. Water was condensed from the exit gas. The exit gas by analysis contained considerable quantities of sulfur as hydrogen sulfide and arsenic as arsine. After about 15 minutes when the analysis of the exit gas indicated that the consumption of hydrogen had substantially decreased, the bed temperature was raised to 550° C. at which temperature the second stage of the hydrogenation was carried out. During the rise in temperature the hydrogen flow was shut off and the nitrogen flow was increased to 0.4 ft. per second in the reactor.

After the bed temperature had reached 550° C. the gas flow was again changed to three moles of hydrogen per mole of nitrogen and a linear velocity of 0.4 ft. per second was maintained. Analysis of the exit gas indicated that hydrogen was again being consumed. Additional quantities of water were condensed from the exit gases. After about two hours' operation at this temperature (550° C.) the gas was shut off, the reactor cooled and the reduced ore concentrate removed from the reactor. A portion of the reduced ore concentrate was subjected to sieve analysis which indicated that no change in the particle size thereof had taken place during the reaction. The product was analyzed and it was shown that 98+ percent of the uranium was in the +4 valent state, i.e., it was in the form of $UO_2$.

Six hundred forty grams of the crude reduced uranium ore concentrate was then reintroduced into a similar Monel fluidized bed reactor. The reactor walls were heated to 250° C. A mixture of nitrogen gas and hydrogen fluoride gas (approximately 3:1 by volume) was passed upwardly through the bed of reduced ore concentrate with a linear velocity of approximately 0.3 ft. per second. Thermocouple rise indicated that an exothermic reaction was taking place, and wall heating was reduced to keep the temperature of the fluidized bed at 250–300° C. The analysis of the exit gases from the reactor showed that water and phosphorus (oxy) fluorides were formed. This first stage reaction was continued for approximately 3 hours at which point analysis of the exit gases showed that substantially no further reaction with HF was taking place.

The temperature of the gas and the reactor walls was then raised to 475° C. During the rise in temperature the HF flow was shut off and the nitrogen flow was increased to 0.3 ft. per second. When the bed temperature approximated 475° C. the gas composition was again changed to three parts of nitrogen to one part of hydrogen fluoride by volume and the linear velocity maintained at 0.3 ft. per second. At this point additional reaction took place between the reduced ore concentrate and the hydrogen fluoride raising the bed temperature to 525° C. More water was formed. The reaction was continued for 4 hours at a bed temperature of 525° C. Thereafter the reactor was cooled and the product removed therefrom. The product analyzed 96% $UF_4$ and 98% of the uranium was present as the tetrafluoride. A sieve analysis showed that no change in particle size had occurred during the hydrofluorination.

The $UF_4$ product was reintroduced into a similar fluidized bed reactor and treated therein under fluidizing conditions with a mixture of nitrogen and fluorine gas (20:1 by volume) at a bed temperature of 200° C. The gas was passed upwardly through the body of $UF_4$-containing ore concentrate at a linear velocity of 0.3 ft. per second such that the body of ore was maintained as a fluid bed during the reaction. The temperatures of the walls of the reactor and of the gas were maintained so that the bed temperature remained at 200° C. Fluorine consumption was substantially quantitative until somewhat less than one fluorine atom had been absorbed per atom of uranium. Thereafter the rate of fluorine adsorption decreased markedly. After 2 hours of reaction time the fluorine flow was cut off, the nitrogen was increased to retain a linear velocity of 0.3 ft. per second, and the bed temperature was gradually raised to 450° C. During the 200° C. stage of the reaction very little volatile material was condensed from the exit gases but the small amount of condensate which was formed was shown by analysis to have substantial amounts of molybdenum and vanadium fluorides. The ore concentrate at the end of this stage was shown by analysis to contain uranium with an average valence of plus five.

When the bed temperature had been increased to 450° C. the fluorine flow was again resumed under conditions such that the ratio of nitrogen to fluorine gas was 10:1 by volume and the linear velocity of the gas was about 0.3 ft. per second. Again smooth absorption of fluorine gas was observed. The bed temperature was maintained at 500° C. $UF_6$ was produced and was carried out of the reactor with the exit gases so that at the end of the reaction (8 hours after the start of the fluorination at 450° C.) less than 1% of the original uranium remained in the reactor. The white solids remaining in the reactor were shown by analysis to contain sodium, calcium, potassium and similar fluorides, fluosilicates, etc.

The crude $UF_6$ from the gas exit stream in the second stage of the fluorination was passed through a condenser maintained at —50° C. The capacity of this condenser was about 100 g. of solid per hour, which constituted the chief limitation on the rate of fluorination. The $UF_6$ (analyzing about 98% pure) was thereafter melted out of the condenser under pressure and was transferred by means of a Monel pot to a Monel still pot.

The still pot was connected through Monel gate valves to two distillation columns each of 1-inch Monel pipe eight feet long. The columns were packed with ¼-inch nickel helices. With one column valved off, the $UF_6$ was refluxed under pressure at about 82° C. in the second column for 24 hours. The reflux condenser temperature was high enough (68° C.) that low-boiling components and a small portion of the $UF_6$ went through and were removed in traps at —50° C. The valves were then reversed so that the previously used column was shut off from the still pot and the $UF_6$ was then allowed to reflux in the other column which was not contaminated by low-boiling impurities. About 90% of the $UF_6$ was then taken off at a reflux ratio of 20:1 and was stored in Monel pots. This cut analyzed 99.9+ percent $UF_6$ and met U.S. Atomic Energy Commission specifications.

*Example 2*

Uranium ore concentrate (1180 g.) assaying 89% $U_3O_8$ with 46% of the uranium in the +4 valence state and having a particle size of 40–200 mesh was charged into a Monel fluidized bed reactor 2 inches inside diameter and 2 feet long. The ore concentrate was dehydrated by passing nitrogen gas at 0.5 ft./sec. at 90° C. into the vessel, through a fritted Monel disk covering the bottom. Then fluorine was added to the nitrogen at such a rate that the bed temperature was kept at 100–120° C. No fluorine could be detected in the off-gases from the reactor until after 0.8 mole of fluorine was absorbed per mole of uranium. The bed temperature was then raised to 185° C. and additional fluorine was added (total=1.1 moles). At these temperatures no $UF_6$ was observed in the off-gases. Then the bed temperature was further raised to 490–500° C. and the addition of fluorine resulted in immediate formation of $UF_6$. In spite of losses through the condenser, $UF_6$ (1095 g.) was recovered in 83% yield based on the original uranium content. Total fluorine input was 4.7 moles per mole of uranium. Less than 1% of the original uranium remained in the fluorination vessel.

*Example 3*

Uranium ore concentrate (650 g.) assaying 68% $U_3O_8$ with 20% of the uranium in the +4 valence state and having a particle size of 40–200 mesh was put in a stainless steel fluidized bed reactor 3 inches in diameter and 2 feet long. A mixture containing 3 parts of hydrogen and 1 part of nitrogen was passed at 0.5 ft./min. into the reactor through a stainless steel filter disk covering the bottom. After 20 minutes at a bed temperature of 410–430° C., analysis showed hydrogen was no longer being absorbed. Hydrogen flow was stopped and the bed temperature was raised to 550° C. Hydrogen flow was started and absorption began again. After an additional 35 minutes, gas flow was stopped, the reactor was cooled, and the oxide was dumped into a vessel sparged with nitrogen. Recovery was 585 g. (90% of original weight).

This crude uranium dioxide was charged into a fluidized bed reactor and was fluorinated according to the description in the previous example. Although condenser trouble prevented recovery of more than a small fraction of the $UF_6$, analysis of the residue in the fluidization vessel indicated that over 99% of the uranium had been volatilized.

*Example 4*

Nine hundred and four grams of uranium ore concentrate analyzing 80% $U_3O_8$ with 0.7% of the uranium in the +4 valence state and having a particle size of 40–200 mesh was added to a Monel fluidized bed reactor 3 inches in diameter and 2 feet high. A mixture of 1 part of nitrogen and 1 part of hydrogen fluoride was passed at 0.5 ft./min. into the vessel through a Monel fritted disk at the bottom. At a bed temperature of 260–300° C. hydrogen fluoride absorption was rapid until about 1 mole of HF was added per mole of uranium. At this point, the bed temperature was raised to 420–460° C. continuing the HF flow. Absorption rate increased for a time and HF flow was continued until about 200% of the theoretical to make crude $UO_2F_2$ was passed through the reactor. The reactor was then cooled.

Without opening the reactor except to make sure that the contents were free-flowing, nitrogen gas at 0.4 ft./sec. was used to fluidize the bed, and the bed temperature was raised to 150° C. Fluorine gas was added to the nitrogen (about $1F_2:3ON_2$) and the bed temperature was maintained between 150° and 200° C. by adjustment of reactor wall temperature and gas temperatures. When $F_2$ began to appear in the exit gas, the bed temperature was raised to 500° C. $UF_6$ immediately appeared in the exit gas. Condenser limitations prevented quantitative recovery of $UF_6$. The reaction was continued until less than 1% of the original uranium was left in the reactor.

Example 5

Seventeen pounds of $UF_4$-containing ore concentrate prepared batchwise by the procedure in Example 1 and having a particle size of 40–200 mesh was charged into a 3-inch diameter Monel fluidized bed reactor (hereafter referred to as "stage 1 reactor") equipped with feeders for adding solid to and taking solid from the reactor continuously during operation. Such a reactor has been described in Chemical Engineering Progress, volume 53, pages 199–202 (April 1957), FIGURE 2, single stage. The reactor was heated to 200° C. and 0.5 ft./sec. of $N_2$ gas was used to fluidize the $UF_4$. Then $F_2$ gas was added to the $N_2$ at a rate of about 3 moles per hour and the wall temperature was adjusted to keep the bed temperature below 250° C. No solid was added to or removed from the reactor for the first four hours to accomplish batchwise conversion of the bed to approximately the state where the uranium fluoride therein had the empirical formula $UF_5$. Then additional $UF_4$ was added to the reactor at a rate of 2.5 pounds per hour and solid was removed from the reactor at such a rate as to keep the bed depth constant. Bed temperature was maintained about 225° C. by controlling reactor wall temperature and inlet gas temperature. The $F_2$ content of the gas was adjusted to about 1.8 moles per hour so that no more than 5% of the entering $F_2$ appeared in the exit gas. After approximately 5 hours of operation, samples taken indicated that equilibrium had been reached. The product at that time analyzed about 90% uranium fluoride having the empirical formula $UF_5$.

Said product analyzing approximately $UF_5$ was collected in a closed bin and was fed at the rate of 2.0 pounds per hour into a 1-inch diameter Monel fluidized bed reactor of design similar to the stage 1 reactor. After 1 hour nitrogen gas was blown through the bed at a velocity of about 0.5 ft./sec. to fluidize the solid and the bed temperature was raised rapidly to 500° C. The nitrogen flow was stopped and $F_2$ was passed into the reactor at a velocity of 0.15 ft./sec., equivalent to about 1 mole/hour. $UF_6$ was immediately generated. At equilibrium, the off-gas contained $UF_6$ (about 1.5 moles/hour) and $F_2$ (about 0.25 mole/hour), together with minor amounts of noncondensable impurities. The off-gas was passed through a condenser at −50° C. wherein about 95% of the $UF_6$ was solidified. This product analyzed about 99% pure. Solid equivalent to about 5% of the feed was removed from the reactor by intermittent operation of the discharge valve.

The noncondensable gas from the $UF_6$ condenser was predominantly $F_2$ and was used as about 15% of the feed to stage 1 reactor operating at equilibrium. Of the $UF_6$ content of the condenser off-gas, essentially all was scrubbed out by reaction with $UF_4$ in stage 1 reactor.

It will be understood that uranium forms both stoichiometric and nonstoichiometric compounds. As exemplary of the latter type there may be mentioned the uranium oxides wherein addition to the stoichiometric compounds $UO_2$, $UO_3$, etc., there exist uranium oxides having the empirical formulas $UO_{2.67}$, $UO_{2.81}$, etc., which have been referred to in the art as nonstoichiometric compounds. The oxidation-reduction potential of uranium is such that oxygen can be continuously added to or removed from a crystal of a given uranium oxide. Gain or loss of oxygen is compensated for by change in the oxidation state of the uranium atoms. It will be understood that the terms "uranium compounds," "uranium oxides" and similar expressions as used herein are inclusive of both the stoichiometric and nonstoichiometric compounds.

What we claim and desire to protect by Letters Patent is:

1. A process for the manufacture of $UF_6$ from a U ore concentrate containing a U oxide wherein the average valence state of the U is greater than +4 but not higher than +6 which comprises:
    A. comminuting and classifying said U ore concentrate to a particle size satisfactory for fluidizing;
    B. reducing any higher-valent U oxides in said ore concentrate to $UO_2$ by contacting said ore concentrate in the form of a fluidized bed with a hydrogen-containing gas in at least two different stages, the contact temperature-time conditions in the first stage being such as are effective to reduce substantially all of the reducible impurities and part of the higher-valent U oxides to $UO_2$ but not being such as to reduce all of said higher-valent U oxides in said ore concentrate to $UO_2$, the contact temperature-time conditions in the last stage being such as are effective to substantially complete the reduction of the higher-valent U oxides to $UO_2$, the contacting in each stage being carried out by passing the hydrogen-containing gas upwardly through a body of said ore concentrate with a gas velocity sufficient to fluidize the body;
    C. converting the $UO_2$ in the resulting reduced ore concentrate to $UF_4$ by contacting said reduced ore concentrate in the form of a fluidized bed with an HF-containing gas in at least two different stages, the contact temperature in the first stage being one which is effective to hydrofluorinate most hydrofluorinatable impurities and some of the $UO_2$ but one which is not so high as to generate sufficient heat to raise the temperature of the bed to the sintering point, the contact temperature-time conditions in the last stage being such as are effective to substantially complete the hydrofluorination of $UO_2$ to $UF_4$, the contacting in each stage being carried out by passing the HF-containing gas upwardly through a body of said reduced ore concentrate with a gas velocity sufficient to fluidize the body;
    D. converting any uranium compounds in the resulting $UF_4$-containing ore concentrate to $UF_6$ by contacting said $UF_4$-containing ore concentrate in the form of a fluidized bed with an $F_2$-containing gas in at least two different stages, controlling the fluorination in the first stage so that a nonvolatile U composition is produced to the substantial exclusion of $UF_6$, the contact temperature in the first stage being one which is effective to initiate the reaction $2UF_4+F_2=2UF_5$ but below about 300° C., the contact temperature-time conditions in the last stage being such as are effective to substantially complete the conversion of the U compounds to $UF_6$, the contacting in each stage being carried out by passing the $F_2$-containing gas upwardly through a body of said U fluoride-containing concentrate with a gas velocity sufficient to fluidize the body; and
    E. condensing $UF_6$ from off-gas streams of the fluorination stages and purifying the resulting $UF_6$ by distillation.

2. The process of claim 1 wherein the off-gases from any stage of any step of the process, when said off-gases contain unused reactant, are recycled to a preceding stage of the particular step involved.

3. A process for the manufacture of $UF_6$ from a U concentrate wherein the U is in the form of a U compound in which the average valence state of the U is from $+4$ to $+6$ which comprises comminuting and classifying said U concentrate to a particle size satisfactory for fluidizing, converting said U concentrate to $UF_6$ by contacting said concentrate in the form of a fluidized bed with an $F_2$-containing gas in at least two different stages, controlling the fluorination in the first stage so that a nonvolatile U composition is produced to the substantial exclusion of $UF_6$, the contact temperature in the first stage being one which is effective to initiate the reaction of the U concentrate with fluorine but below about 300° C., the contact temperature-time conditions in the last stage being such as are effective to substantially complete the conversion of the U compounds contained in said U concentrate to $UF_6$, the contacting in each stage being carried out by passing the $F_2$-containing gas upwardly through a body of said U concentrate with a gas velocity sufficient to fluidize the body, and condensing any $UF_6$ from the off-gas streams of the fluorination stages.

4. The process of claim 3 wherein there is employed a U concentrate wherein the U is in the form of a U oxide in which the average valence state of the U is from $+4$ to $+6$.

5. The process of claim 3 wherein there is employed a U concentrate wherein the U is in the form of $UO_2F_2$.

6. The process of claim 3 wherein there is employed a U concentrate wherein the U is in the form of a U fluoride in which the average valence state of the U is from $+4$ to $+5$.

7. The process of claim 3 wherein there is employed a U concentrate wherein the U is in the form of a material selected from the group consisting of oxides of U chemically combined with an acidic oxide and oxides of U chemically combined with a basic oxide, the average valence state of the U in either case being from $+4$ to $+6$.

8. The process of claim 4 wherein there is employed a U concentrate wherein the U is in the form of $UO_3$.

9. The process of claim 4 wherein there is employed a U concentrate wherein the U is in the form of $U_3O_8$.

10. The process of claim 6 wherein there is employed a U concentrate wherein the U is in the form of $UF_4$.

11. The process of claim 3 wherein the $UF_6$ produced thereby is purified by distillation.

12. The process of claim 3 wherein the off-gases from any fluorination stage subsequent to the first fluorination stage are recycled as feed gas to a preceding fluorination stage.

References Cited in the file of this patent

UNITED STATES PATENTS

| | | |
|---|---|---|
| 2,621,118 | Cyr et al. | Dec. 9, 1952 |
| 2,804,368 | Summers | Aug. 27, 1957 |
| 2,810,626 | Fowler | Oct. 22, 1957 |
| 2,811,413 | McMillan | Oct. 29, 1957 |
| 2,811,414 | Murphree | Oct. 29, 1957 |

OTHER REFERENCES

J. of Chemical Education (Ad. Sec.), vol. 24, No. 6, June 1947, page 306.

Katz et al.: Chemistry of Uranium (1951), pp. 116, 304–306, 361 and 396–403; McGraw-Hill Book Co., Inc., New York.

Sittig: Chemical Engineering, May 1953, pp. 219–231.

Kalbach: Chemical Engineering, January 1957, pp. 105–108.